United States Patent [19]

Kanamaru

[11] Patent Number: 5,154,217
[45] Date of Patent: Oct. 13, 1992

[54] HEAVY-DUTY PNEUMATIC TIRE PREVENTING BELT SEPARATION

[75] Inventor: Masahiko Kanamaru, Zushi, Japan

[73] Assignee: The Yokohama Rubber Co., Ltd., Tokyo, Japan

[21] Appl. No.: 479,892

[22] Filed: Feb. 14, 1990

Related U.S. Application Data

[63] Continuation-in-part of Ser. No. 105,372, Oct. 7, 1987, abandoned.

[30] Foreign Application Priority Data

Nov. 21, 1986 [JP] Japan .................. 61-276699

[51] Int. Cl.⁵ .................. B60C 9/20; B60C 9/18
[52] U.S. Cl. .................. 152/527; 152/532; 152/535; 152/537; 152/538
[58] Field of Search ........... 152/526, 527, 525, 532, 152/535, 536, 537, 538, 451, DIG. 19

[56] References Cited

U.S. PATENT DOCUMENTS

| | | |
|---|---|---|
| 3,335,777 | 8/1967 | Hutch. |
| 3,513,898 | 5/1970 | Lugli et al. .................. 152/535 |
| 3,789,900 | 2/1974 | Verdier .................. 152/535 |
| 4,082,132 | 4/1978 | Arai et al. .................. 152/532 |
| 4,169,495 | 10/1979 | Maiocchi .................. 152/527 |
| 4,282,918 | 8/1981 | Tomada et al. .................. 152/532 |
| 4,373,566 | 2/1983 | Hirakawa et al. .................. 152/532 |
| 4,425,953 | 1/1984 | Rohde et al. .................. 152/538 |
| 4,633,926 | 1/1987 | Tamura .................. 152/538 |
| 4,715,419 | 12/1987 | Kawasaki et al. .................. 152/535 X |
| 4,865,103 | 9/1989 | Kobayashi et al. .................. 152/538 |
| 4,947,914 | 8/1990 | Noma et al. .................. 152/536 |

FOREIGN PATENT DOCUMENTS

| | | | |
|---|---|---|---|
| 58305505 | 3/1978 | Japan .................. | 152/537 |
| 1067865 | 5/1967 | United Kingdom .................. | 152/532 |

Primary Examiner—Michael W. Ball
Assistant Examiner—Adrienne C. Johnstone
Attorney, Agent, or Firm—Nikaido, Marmelstein, Murray & Oram

[57] ABSTRACT

A heavy-duty pneumatic tire having a plurality of belt layers, wherein the outermost belt layer is made of a steel cord having a breaking extension of 4% or more and covers the end portion in the width direction of a first belt layer adjacent to the undersurface of said outermost belt layer, a rubber stock is provided on the outside of the end portion in the width direction of said first belt layer, the cord of said first belt layer and the cord of a second belt layer adjacent to the undersurface of said first belt layer are each inclined at an angle of 15° to 25° with respect to the circumferential direction of the tire and cross each other.

3 Claims, 5 Drawing Sheets

MAGNITUDE OF PLY SEPARATION OF CROSSING BELT LAYERS

POSITION OF THE PLY SEPARATION IN THE CIRCUMFERENTIAL DIRECTION OF THE TIRE

MAGNITUDE OF PLY SEPARATION OF CROSSING BELT LAYERS

POSITION OF THE PLY SEPARATION IN THE CIRCUMFERENTIAL DIRECTION OF THE TIRE

POSITION OF THE PLY SEPARATION IN THE CIRCUMFERENTIAL DIRECTION OF THE TIRE

HEAVY-DUTY PNEUMATIC TIRE PREVENTING BELT SEPARATION

This application is a continuation-in-part application of copending application Ser. No. 105,372, filed Oct. 7, 1987.

BACKGROUND OF THE INVENTION

This invention relates to a belt portion structure suitable for use in a rough road radial tire. More particularly, the present invention is concerned with a heavy-duty pneumatic tire adapted to prevent the separation of the end of the belt layer without lowering the resistance to heat build-up.

Generally, travelling on rough roads tends to cause various kinds of damage to the surface of the tread of a tire due to the action of gravel, tiles and pebbles, and crushed stone, etc.

For this reason, the tread portion of a tire for use in travel on rough roads is made of rubber different from the tread rubber of a tire for use in travel on a paved high-speed road. That is, it is made of rubber comprising a special blend which has excellent chipping resistance but sacrifices the resistance to heat build-up to some extent.

However, the conventional rough road tire has a plurality of belt layers laminated on top of another and disposed in the tread portion in a circular form in the circumferential direction of the tire of which the outermost belt layer has a width narrower than that of the belt layer adjacent to the undersurface thereof as in the tire for use in travel on an ordinary paved high-speed road, which leads to the occurrence of the separation of the end of the belt layer due to occurrence of penetrating cuts from the tread surface under severe working conditions of travel on rough roads.

SUMMARY OF THE INVENTION

The heavy-duty pneumatic tire for attaining the above object according to the present invention is characterized by having in its tread portion a belt structure of at least three belt layers comprising an outermost belt layer, a first belt layer adjacent to the undersurface of the outermost belt layer and a second belt layer adjacent to the undersurface of the first belt layer; the outermost belt layer comprising steel cords having an elongation at break of 4.5 to 6% and having a width greater than the width of the first belt layer but smaller than the width of the second belt layer; end portions in the widthwise direction of the outermost belt layer covering the corresponding end portions in the widthwise direction of the first belt layer; on the outer side of the ends in the widthwise direction of the first belt layer, sandwiched between the corresponding end portions in the widthwise direction of the outermost belt layer and those of the second belt layer, a rubber stock being incorporated, which has a 100% modulus which is larger than that of a tread rubber and is 0.4 to 0.5 kg/mm$^2$; cords in the first belt layer and those in the second belt layer being at an angle of 15° to 25° to the circumferential direction of the tire and crossing one another.

DETAILED DESCRIPTION OF THE PREFERRED EMBODIMENTS

Figures 6, 7:
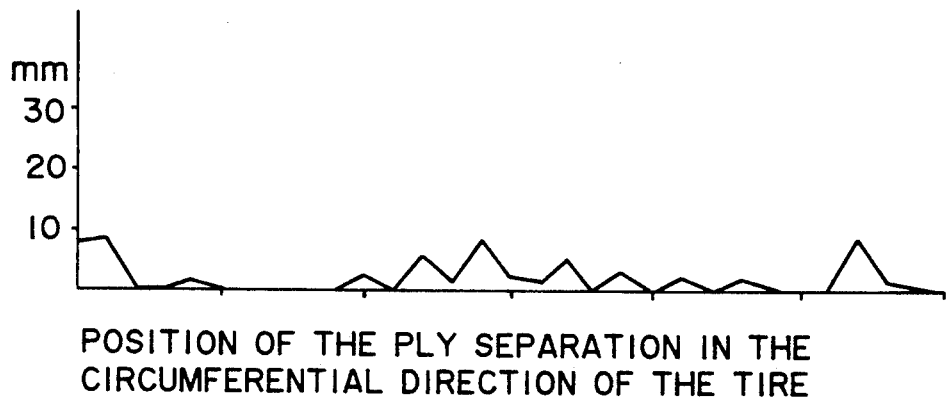
FIG. 6 is a graph showing the relationship between the magnitude of ply separation of crossing belt layers of the tire according to the present invention and the position of the ply separation in the circumferential direction of the tire with respect to the tire according to the present invention.
FIG. 7 is a meridian half cross-sectional view of an example of the conventional tire.

As shown in FIG. 7, the conventional rough road tire has a plurality of belt layers 2, 3, 4, 5 laminated on top of another and disposed in the tread portion 7 in a circular form in the circumferential direction of the tire of which the outermost belt layer 5 has a width narrower than that of the belt layer 4 adjacent to the undersurface thereof as in the tire for use in travel on an ordinary paved high-speed road, which leads to the occurrence of the separation of the end of the belt layers due to occurrence of penetrating cuts from the tread surface under severe working conditions of travel on rough roads. The belt layers 3, 4 are supporting layers adapted for practically supporting major strength of the tire, and the cords constituting them cross each other.

Figure 8A:
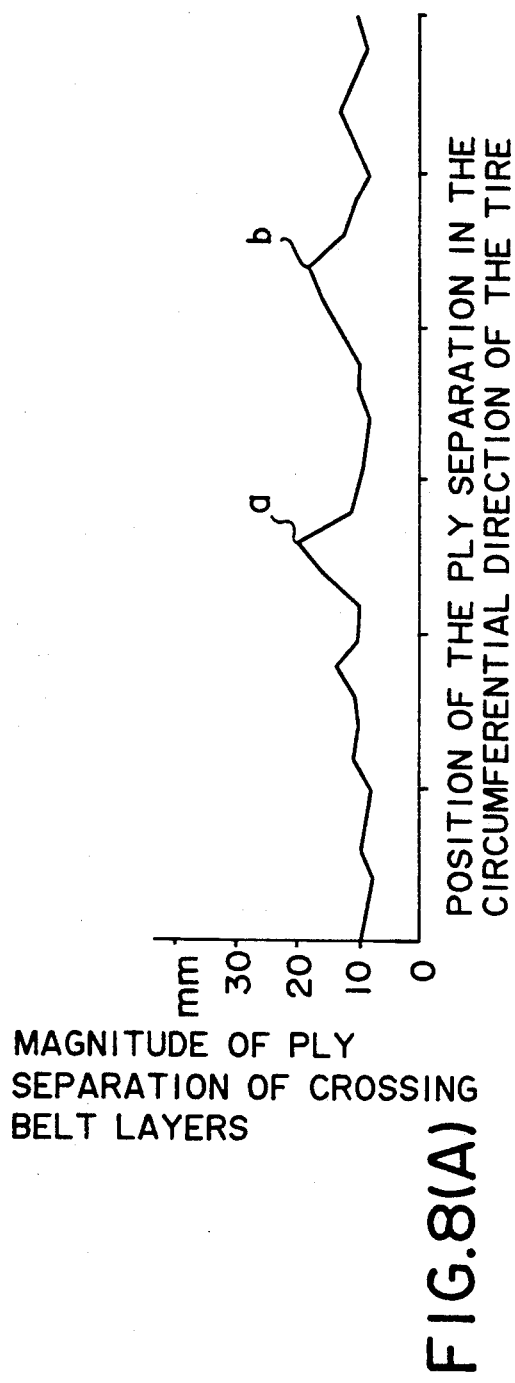
FIGS. 8(A) and (B) are graphs showing the relationship between the position of ply separation in the circumferential direction of the tire and the magnitude of ply separation of crossing belt layers with respect to the conventional tire after travel on a rough road.
Figure 8B:
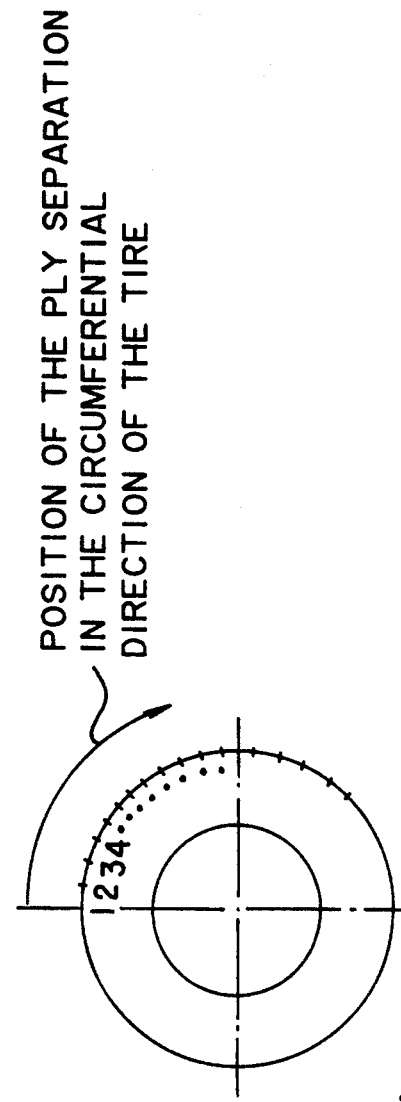

FIGS. 8(A) and (B) are graphs showing the relationship between the position of ply separation in the circumferential direction of the tire and the magnitude of ply separation of crossing belt layers with respect to the conventional tire after travel on a rough road. As can be seen in FIG. 8(A), the conventional tire causes partially large separations a and b attributable to occurrence of cuts on the surface of the tread.

A generally accepted expedient in the past for preventing the penetration of the cut from the surface of the tread which triggers the separation was to increase the gauge (thickness) of the tread portion 7. However, as mentioned above, this expedient brings about excess heat build-up in the tread portion during travel due to the characteristics of the rubber used in the tread portion of the rough road tire, which leads to not only the deterioration of the adhesion between the tread and the belt layers but also the deterioration of the physical properties of the rubber around the belt layers, thus making it impossible to realize a tire with a belt portion having excellent durability.

The present inventors studied damaged tires from various points of view to thoroughly solve the problems on the occurrence of separation of the end of the belt layers. As a result, the present inventors have found the following facts.

Figure 9:
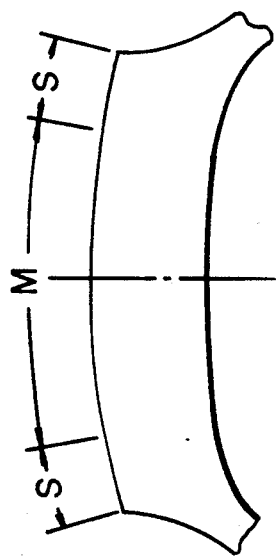
FIG. 9 is a cross-sectional view of a tread portion showing the central area and shoulder portion area on the surface of the tread.

Specifically, when the width of the tread is divided into three parts including the center of the tread and both shoulder portions as shown in FIG. 9, the number of the cuts occurring on the central area M corresponding to about ⅔ of the width of the tread amounts to about 70 to 80% of the total number of the cuts occurring on the surface of the tread during travel on a rough road, while the number of the cuts on the shoulder areas S each corresponding to about 1/6 of the width of the tread amounts to about 20 to 30% of the total number of the cuts occurring on the surface of the tread during travel on a rough road. Further, the present inventors have scrutinized various tires on the separation occurring at the end portion of the belt layer of the tire after travel on a rough road over the entire circumference of the tire. As a result, the present inventors have found that, for example, as shown in a and b of FIG. 8(A), large separations occur locally in random positions of the circumferential direction of the tire and that a penetrating cut from the surface of the tread is inevitably present in these portions.

That is, the present inventors have found that taking a measure different from that with respect to tires for an ordinary paved high-speed road, i.e., prevention of penetration of cuts which have occurred on the surface of the tread into the end portion of the belt layers is very important to solve the problem on the occurrence of separation of the end of the belt layers in a tire for travel on a rough road.

The study on the conventional tire based on this new finding leads to a conclusion that the penetration of cuts into the end portion of the belt layer located in the above-mentioned shoulder areas cannot be prevented, even if attempts are made to prevent the occurrence of separation at the end of the belt layers attributable to cuts from the surface of the tread occurring during travel on a rough road. Specifically, in the conventional tire having a structure as shown in FIG. 7, even when a measure such as an increase in the thickness of the rubber of the tread is taken, any remarkable improvement cannot be expected due to high heat build-up characteristics of the rubber which is generally used in the tread portion of the tire for travel on a rough road, in combination with the fact that the deterioration of the adhesion around the belt layers is disadvantageously promoted.

Figure 1:
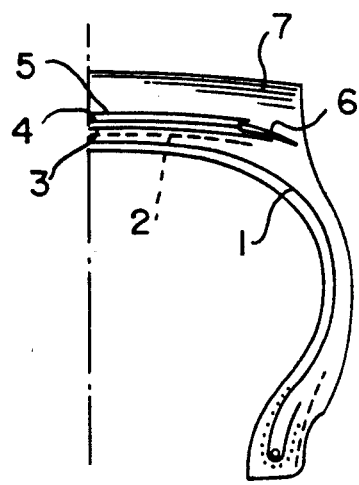
FIG. 1 is a meridian half cross-sectional view of one form of the tire according to the present invention.
Figure 2:
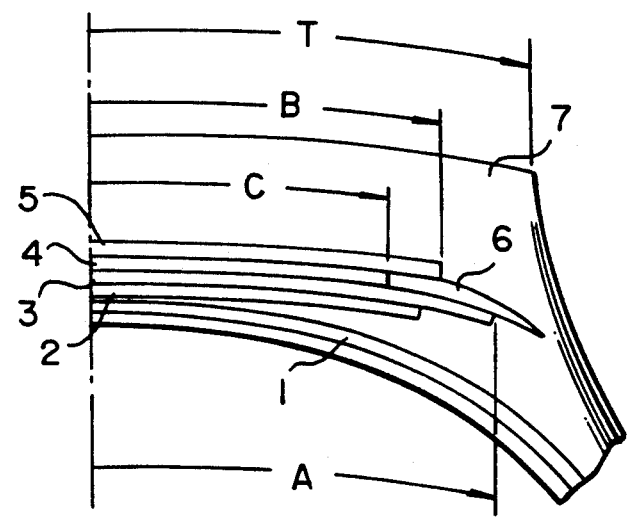
FIG. 2 is an enlarged cross-sectional view of the principal portion of the tire as shown in FIG. 1.

(1) In the present invention, as shown in FIGS. 1 and 2, a plurality of belt layers 2, 3, 4, 5 are laminated on top of another and disposed on a carcass layer 1 in the tread portion 7 in a circular form in the direction of the circumferential direction of the tire.

The outermost belt layer 5 is comprised of a steel cord having a high elongation, i.e., an elongation at break at 4.5 to 6%. The purpose of using steel cords having an elongation at break of 4.5 to 6% is to buffer the impact from an uneven road surface during travel on a rough road with the outermost belt layer and, at the same time, to prevent the outermost belt layer from breaking when the cuts from the surface of the tread penetrate through the tread portion 7 and reach the belt layer, thereby preventing the cuts from penetrating into the first belt layer 4 adjacent to the undersurface of the outermost belt layer. The term "elongation at break" as used herein means an elongation at a point where the cord is broken, i.e., the percentage ratio of the elongation at breakage (mm) to the clamping distance of the specimen (mm).

2) The width B of the outermost belt layer 5 is wider than the width C of the first belt layer 4 adjacent to the undersurface of the outermost belt layer 5, and is smaller than width A of the second belt layer 3 adjacent to the undersurface of the first belt layer 4. The end portion in the width direction of the first belt layer 4 is covered with the end portion in the width direction of the outermost belt layer 5. Proper adjustment of the relationship between the width of the outermost belt layer 5 and the width of the first belt layer 4 adjacent to the undersurface of the outermost layer 5 serves to prevent that cut from penetrating into the end of the first belt layer 4, thereby preventing the occurrence of separation at the end of the first belt layer 4. Letter A stands for the width of the second belt layer 3 adjacent to the undersurface of the first belt layer 4, and letter T the width of the ground-contacting portion of the tread surface. Also, according to the invention, the width B is set to be smaller than the width A, whereby locations of corresponding ends of respective belt layers can be scattered and it is possible to avoid a concentration of strains at any single end of the belt structure comprising respective belt layers. In addition, it is also possible to promote the effect of moderating strain exhibited by the rubber stock 6.

A rubber stock 6 is provided on the outside of the end portion in the width direction of the first belt layer 4 provided under the end portion in the width direction of the outermost belt layer 5. The provision of the rubber stock 6 is based on the finding obtained by various studies conducted by the present inventors that the most excellent durability could be attained when a concentrically circular relationship exists between the configuration of the outermost layer 5 and that of the arcuated tread surface. Specifically, the outermost belt layer provided so as to establish a concentrically circular relationship between the outermost belt layer and the tread surface prevents the end portion of the outermost belt layer 5 from hanging down, thus preventing the occurrence of separation. Thus, according to the present invention, in addition to incorporating the rubber stock 6, it is made that in the meridian sectional view of a tire shown in FIG. 2, an arc taken by the outer surface of the outermost layer 5 is concentric with an arc taken by the tread surface. Also, the rubber stock 6 has a 100% modulus (a modulus at 100% elongation) of 0.4 to 0.5 kg/mm². A rubber stock of which the 100% modulus is larger than 0.5 kg/mm² has such a high hardness that separation of end portions of belt layers tend to occur, and the durability of belt layers tends to be lowered. On the other hand, rubber stocks having a 100% modulus smaller than 0.4 kg/mm² tend to be so soft that the end portion of the outermost belt layer tends to undergo bending, and strain tends to concentrate at belt end portions.

The tread rubber around the rubber stock 6 has a 100% modulus generally within a range of 0.25 to 0.35 kg/mm², and the rubber stock 6 has a greater 100% modulus than the tread rubber.

Respective belt layers comprise steel cords embedded in a coat rubber, which has a 100% modulus of 0.6 to 0.8 kg/mm$^2$.

Further, in a region between respective ends in the widthwise direction of the first belt layer and the corresponding ends in the widthwise direction of the outermost belt layer, the rubber stock has a same thickness as the first belt layer.

Figure 3:
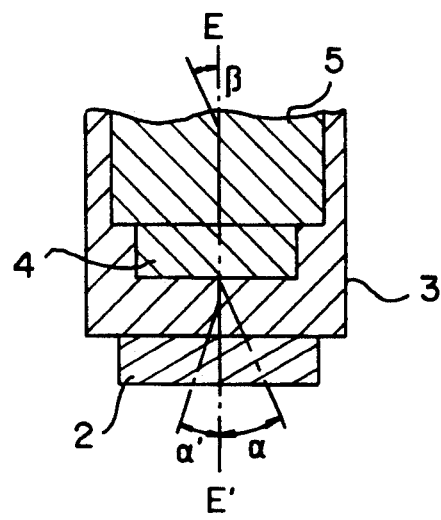
FIG. 3 is a plan view of one form of a belt structure of the tire according to the present invention.

(3) Further, in the present invention, the cord of the first belt layer 4 and the cord of the second belt layer 3 are each inclined at an angle of 15° to 25° with respect to the circumferential direction of the tire and cross each other. Specifically, as shown in FIG. 3, the angle α of the cord of the first belt layer 4 with respect to the circumferential direction EE' of the tire is 15° to 25°, and the angle α' of the cord of the second belt layer 3 is also 15° to 25°. When these cord angles are less than 15°, the rigidity in the meridian cross-sectional direction of the tread portion is lowered, which causes an increase in the movement of the end of the belt layer during the cycle of ground contact and ground non-contact in the tread portion accompanying the rotation of the tire, thus unfavorably leading to the occurrence of separation. On the other hand, when the cord angles exceed 25°, since the weight of the tread rubber portion of the tire for travel on a rough road is considerably larger than that of the tire for travel on an ordinary paved road, because of the greater gauge of tread rubber, this weight tends to cause damage at an early stage because the belts do not have circumferential strength sufficient to resist the force caused by rotation of the tread portion. The angle β of the cord of the outermost belt layer 5 is not particularly limited.

Figure 4:
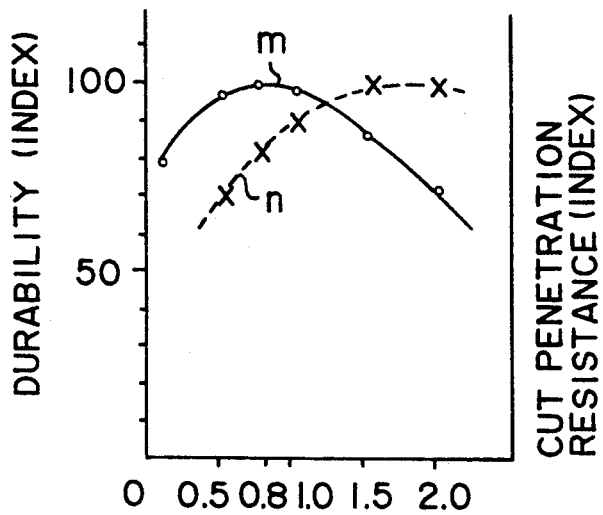
FIG. 4 is a graph showing the relationship between the durability or the cut penetration resistance and the gauge between the outermost belt layer and the first belt layer.
Figure 11:
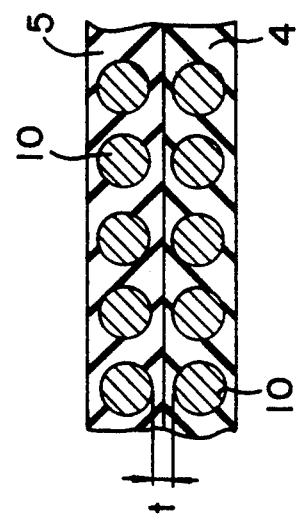
FIG. 11 shows a partial sectional view, showing in enlargement portions of the outermost belt layer and the first belt layer shown in FIG. 2.

Preferably, the gauge between the cords of the outermost belt layer 5 and those of the first belt layer, namely the gauge t (inter-cord distance) between the cords 10 and 10 in FIG. 11, is 0.8 to 1.5 times the average diameter of cords. Specifically, as shown in FIG. 4, when the gauge is less than 0.8, both the durability and the cut penetration resistance are lowered, while when it exceeds 1.5, the durability is rapidly lowered. In FIG. 4, a curve m refers to the durability and a curve n the cut penetration resistance.

Figure 5:
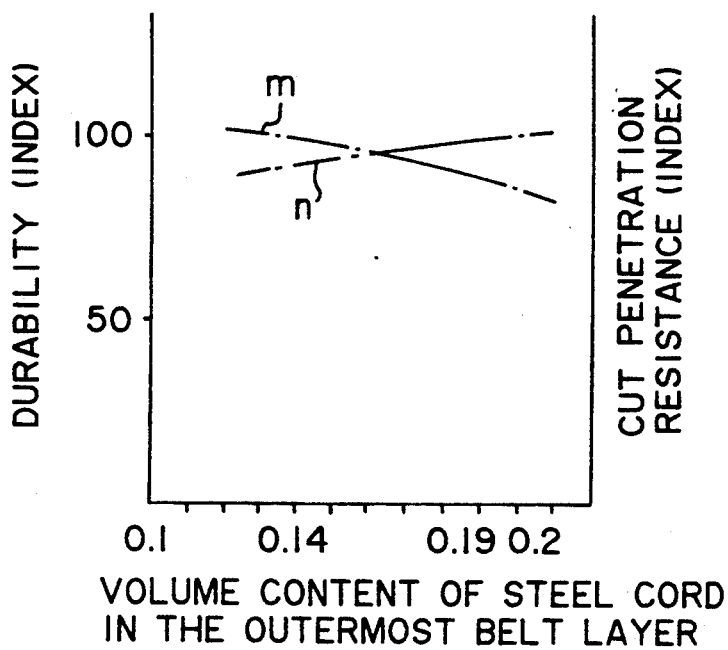
FIG. 5 is a graph showing the relationship between the durability or the cut penetration resistance and the content, by volume, of steel cord in the outermost belt layer.

The steel cord content, by volume, of the outermost belt layer 5 (i.e., the number of ends) is preferably 14%–19% (0.14 to 0.19). As shown in FIG. 5, when the steel cord content is less than 0.14, the cut penetration resistance is rapidly lowered, while when the steel cord content exceeds 0.19, the durability is rapidly lowered. In FIG. 5, a curve m refers to the durability and a curve n the cut penetration resistance.

As shown in FIG. 6, the tire of the present invention having the above-mentioned structure does not bring about large local separation as opposed to the conventional tire.

The present invention will now be described in more detail with reference to the following example.

EXAMPLE

The following tires, i.e., the tire of the present invention, a conventional tire, and comparative tires 1, 2, and 3 having the same tire size were applied to unpaved road travel tests to examine the occurrence of separation of the end of the belt layer. The results are shown in Table 1.

(1) Tire of the present invention

It has a tire size of 10.00 R20 14PR. The belt portion has a structure as shown in FIGS. 1 and 2. The elongation at break of the steel cord of the outermost belt layer is 4.5%. The cord angle α of the first belt layer is 20°. The cord angle α' of the second belt layer is 20°. The cords of the first belt layer and the cords of the second belt layer cross each other. A rubber stock 6 is provided on the outside of the end portion in the width direction of the first belt layer.

The rubber stock 6 has a 100% modulus of 0.47 kg/mm$^2$, the tread rubber has a 100% modulus of 0.30 kg/mm$^2$, and coat rubber of respective belt layers has a 100% modulus of 0.67 kg/mm$^2$. Further, the thickness of the rubber stock 6 in the region between the end in the widthwise direction of the first belt layer and the end in the widthwise direction of the outermost belt layer is the same as the thickness of the first belt layer. The gauge between the cords of the outermost belt layer and the first belt layer is 1.1 times the average diameter of the cords, and the outermost belt layer has a steel cord content, by volume, of 17%.

(2) Conventional Tire

It has a tire size of 10.00 R20 14PR. The belt portion has a structure as shown in FIG. 7.

(3) Comparative tire 1

It has a tire size of 10.00 R20 14PR. The belt portion has a structure as shown in FIGS. 1 and 2. The elongation at break of the steel cord of the outermost belt layer is 4.5%. The cord angle α of the first belt layer is 27°. The cord angle α' of the second belt layer is 27°. The cords of the first belt layer and the cords of the second belt layer cross each other. Other conditions are the same as those of the above tire of the present invention (1).

(4) Comparative tire 2

It has a tire size of 10.00 R20 14PR. The belt portion has a structure as shown in FIGS. 1 and 2. The elongation at break of the steel cord of the outermost belt layer is 4.5%. The cord angle, α, of the first belt layer is 13°. The cord angle α' of the second belt layer is 13°. The cords of the first belt layer and the cords of the second belt layer cross each other. Other conditions are the same as those of the above tire of the present invention (1).

(5) Comparative tire 3

Figure 10:
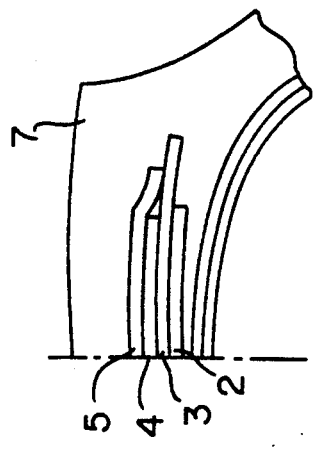
FIG. 10 is a cross-sectional view showing the same belt structure as the one shown in FIG. 2, except that no rubber stock is provided.

It has a tire size of 10.00 R20 14PR. The belt portion has a structure as shown in FIG. 10. It is the same as the tire of the present invention mentioned in the above item (1), except that no rubber stock is provided on the outside of the end portion in the width direction of the first belt layer.

(6) Comparative tire 4

Except that the rubber stock 6 has a 100% modulus of 0.52 kg/mm$^2$, this tire corresponds to the above tire of the present invention (1).

(7) Comparative tire 5

Except that the rubber stock 6 has a 100% modulus of 0.35 kg/mm$^2$, this tire corresponds to the above tire of the present invention (1).

Unpaved road travel tests

Each tire was mounted on a vehicle, and the vehicle was travelled on an unpaved road at an average speed of 60 km/hr for hr. Thereafter, the occurrence of separation at the end of the belt layer was examined. The results are shown in Table 1.

TABLE 1

|  | tire of the present invention | conventional tire | comp. tire 1 | comp. tire 2 | comp. tire 3 | comp. tire 4 | comp. tire 5 |
| --- | --- | --- | --- | --- | --- | --- | --- |
| separation | not occurred | occurred | slightly occurred | slightly occurred | * | * | slightly occurred |

Note: *The travel was stopped 358 hours after initiation of the travel because of occurrence of separation.

As can be seen from Table 1, the tire of the present invention does not bring about any separation at the end of the belt layer even after travel on an unpaved road at an average speed of 60 km/hr for 617 hr.

As is apparent from the foregoing description, the present invention enables the durability of a tire to be improved through the prevention of occurrence of separation at the end of the belt layer during travel on a rough road without detriment to the resistance to heat build-up.

I claim:

1. A heavy-duty pneumatic tire having a tread portion including a belt structure of at least three belt layers, said at least three belt layers comprising an outermost belt layer, a first belt layer adjacent to the undersurface of said outermost belt layer and a second belt layer adjacent to the undersurface of said first belt layer; each respective belt layer being comprised of cords coated with a coat rubber having a modular at 100% elongation of 0.6 to 0.8 kg/sq.mm; said outermost belt layer comprising steel cords having an elongation at break of 4.5 to 6% and having a width greater than the width of said first belt layer but smaller than the width of said second belt layer; end portions in the widthwise direction of said outermost belt layer covering the corresponding end portions in the widthwise direction of said first belt layer; wherein in a meridian section of the tire, the entire width of the outer surface of said outermost belt layer forms an arc, which is concentric with an arc formed by the outer surface of said tread portion; a rubber stock on each outer side of the ends in the widthwise direction of said first belt layer, said rubber stock being sandwiched between the corresponding end portions in the widthwise direction of said outermost belt layer and end portions of said second belt layer and having a modulus at 100% elongation of 0.4 to 0.5 kg/sq.mm which is larger than a modulus of a tread rubber at 100% elongation of 0.25 to 0.35 kg/sq.mm; cords in said first belt layer and said second belt layer being at an angle of 15 to 25 degrees to the circumferential direction of the tire and crossing one another; and wherein in a region between respective ends in the widthwise direction of said first belt layer and the corresponding respective ends in the widthwise direction of said outermost belt layer, said rubber stock has a thickness identical with the thickness of said first belt layer.

2. A tire as claimed in claim 1, which has an intercord gauge between cords of said outermost belt layer and cords of said first belt layer, which is 0.8 to 1.5 times an average diameter of the cords.

3. A tire as claimed in claim 1, wherein said outermost belt layer has a steel cord content, by volume, of 14 to 15%.

* * * * *